No. 724,590. PATENTED APR. 7, 1903.
S. C. LAWLOR.
WINDOW CLEANING APPARATUS.
APPLICATION FILED JAN. 27, 1902.
NO MODEL.
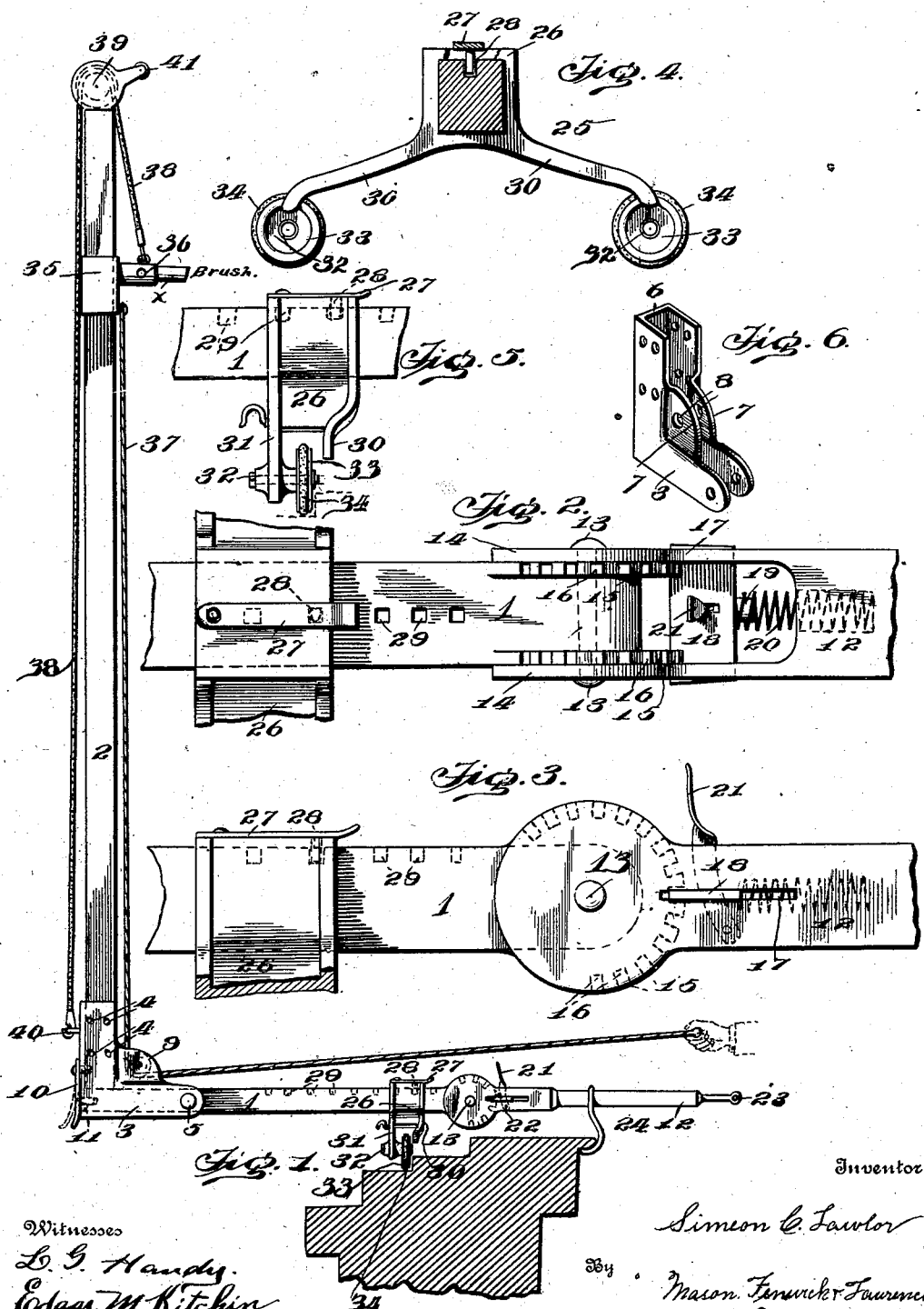
Witnesses
L. G. Handy.
Edgar M. Kitchin
Inventor
Simeon C. Lawlor
By Mason, Fenwick & Lawrence
his Attorneys

UNITED STATES PATENT OFFICE.

SIMEON C. LAWLOR, OF DULUTH, MINNESOTA.

WINDOW-CLEANING APPARATUS.

SPECIFICATION forming part of Letters Patent No. 724,590, dated April 7, 1903.

Application filed January 27, 1902. Serial No. 91,397. (No model.)

*To all whom it may concern:*

Be it known that I, SIMEON C. LAWLOR, a citizen of the United States, residing at Duluth, in the county of St. Louis and State of Minnesota, have invented certain new and useful Improvements in Window-Cleaning Apparatus; and I do hereby declare the following to be a full, clear, and exact description of the invention, such as will enable others skilled in the art to which it appertains to make and use the same.

This invention relates to improvements in window-washers, and more particularly to such as are designed to clean the outside of a window while being operated from the inside.

The object in view is the production of such a window-washer capable of ready positioning, designed to be easily removed, and provided with means of support while in operation adapted to retain the parts in position without the attention of the operator.

With this and other objects in view the invention consists in certain novel constructions, combinations, and arrangements of parts, as will be hereinafter fully described and claimed.

In the accompanying drawings, Figure 1 represents a view in side elevation, illustrating a window-washer embodying the features of the present invention. Fig. 2 represents an enlarged view in top plan of a portion of the horizontal standard. Fig. 3 represents a similar view in side elevation. Fig. 4 represents an enlarged detail view in elevation of the standard-carriage. Fig. 5 represents an edge view of the same. Fig. 6 represents a detail perspective view of the standard-end-inclosing casing. Fig. 7 represents a fragmentary view of a slightly-modified form of vertical standard.

Referring to the drawings by numerals, 1 indicates a suitable horizontal bar, and 2 a vertically-arranged standard resting upon the outer ends of the horizontal bar and the contacting ends of the two standards being inclosed by a casing 3, said casing being rigidly secured, as at 4, to the standard 2 and pivoted, as at 5, to bar 1. The casing 3 is open at its front edge and at its lower edge, said casing being provided with a solid back 6 and having its arms extending at right angles with webbing 7 7, joining the inner corners thereof, said webbing being preferably pinched or bent toward each other, whereby the space therebetween is less than that between the sides of said casing. The webbing 7 is preferably apertured, as at 8 8, for receiving the journals of a pulley 9. Secured to the back 6 of casing 3 is a spring 10, provided with a locking-stud 11, designed in operation to pass through a suitable aperture in the wall 6 and into the outer end of bar 1, whereby said bar may be locked against movement upon its pivot 5.

The inner end of bar 1 preferably carries an arm 12, pivoted thereto, as at 13, said arm being bifurcated and extending upon either side of the bar 1, as at 14 14, for receiving a pivot 13. The inner end of the bar 1 is preferably finished off in disk or circular form, as at 15, and provided with notches 16, extending transversely therethrough and radially thereof. The arm 12 is preferably slotted longitudinally, as at 17 17, in each of the members of its bifurcation 14 for receiving a locking-slide 18, the ends of which move within said slots. A lug, as 19, preferably projects laterally from slide 18 and is designed to be surrounded by a coil-spring 20 or other suitable means for pressing the slide 18 forwardly and normally retaining its forward edge in engagement with notches 16, whereby the arm 12 and bar 1 will be rigidly locked in a given relation to each other. A suitable lever, as 21, preferably extends through slide 18 and is pivoted, as at 22, to arm 12 and is designed to be moved against the pressure of spring 20 for releasing the engagement of slide 18, whereby the arm 12 may be caused to assume any desired angle relative to bar 1. The inner end of arm 12 is preferably provided with any suitable form of handle 23, and said arm carries any suitable form of loosely-mounted hook, as 24, preferably provided with an eye surrounding said arm and its lower end designed to engage the inner ledge of a window-casing for retaining the arm 12 and bar 1 in a given position when the handle 23 is not being held by the operator.

In the operation of the present improved window-washer it has been found desirable to move the entire structure laterally in order that all of the parts of the window being operated upon may be affected, and in order to facilitate such lateral movement I provide a carriage 25, formed of a sleeve 26, designed to inclose and be slidably mounted upon the bar 1. The sleeve 26 preferably carries a spring, as 27, provided with an inwardly-projecting locking-lug 28, designed to engage notches, as 29 29, formed in bar 1, for locking the sleeve 26 in various adjusted positions longitudinally of said bar. Projecting laterally from sleeve 26 are arranged suitable arms 30 and 31, the arms 31 providing any suitable bearings for axles 32 of wheels 33, the said wheels being prevented from having lateral movement by means of arms 30. Each of the wheels 33 is preferably provided with a suitable tire 34, and in operation the said wheels are designed to move upon the horizontal portion of a window-casing and carry the entire window-washing structure laterally, as before suggested.

The standard 2 is designed to be surrounded by a slidably-mounted sleeve 35, carrying a laterally-projecting arm 36, designed to carry any desired form of window-cleaning apparatus, as a suitable brush or other means X. Attached to sleeve 35 is a suitable cord or other flexible means, as 37, which passes downwardly from said sleeve about pulley 9 and is designed to have its inner end grasped by the operator. Also connected with the sleeve 35 is an elastic cord or other suitable elastic means 38, which is passed about a pulley 39, mounted at the upper end of standard. The elastic means 38 is preferably passed downwardly longitudinally of the standard 2 and has its lower end secured, as at 40.

In operating the present improved window-washer the same is positioned as indicated in Fig. 1 of the drawings, and the operator grasps the inner end of cord 37 and by successively pulling on said cord and releasing the same he will reciprocate the sleeve 35, the elastic means 38 always returning said sleeve to its normal position after having been pulled downwardly.

Any suitable bumper 41 may be arranged at the upper end of standard 2 for cushioning the blow given by said standard upon the glass being operated upon when the said standard is accidentally thrown forwardly.

When it is desired to remove the window-washing apparatus, all that is necessary is to press outwardly upon spring 10 until stud 11 has become disengaged from bar 1 and swings the said bar outwardly upon its pivot 5, whereby the bar 1 and standard 2 may be folded together and lie approximately in parallel planes, thereby facilitating lifting the apparatus through an open window for removing or positioning the same as desired.

Although I have specifically set forth the details of one particular embodiment of the present improved device, yet I do not wish to be understood as limiting myself to the minor features of structure, but shall feel at liberty to deviate therefrom to any degree within the spirit and scope of the present invention.

Having thus fully described my invention, what I claim as new, and desire to secure by Letters Patent, is—

1. In a window-washing apparatus, the combination with a bar carrying window-washing means, of a sleeve slidable thereupon, notches being formed in said bar, a detent engaging said notches for locking said sleeve against movement with respect to the bar, and antifriction means carried by said sleeve movably supporting the same with the bar, substantially as described.

2. In a window-washing apparatus, the combination of a vertical standard, window-cleaning means carried thereby, a casing inclosing the lower end of said standard and secured thereto, a horizontal bar pivoted to said casing and extending into the same, and means for locking said horizontal bar against movement upon its pivot, substantially as described.

3. In a window-washing apparatus, the combination with a bar carrying window-washing means, notches being formed in said bar, at various points intermediate its length, of a sleeve inclosing said bar and slidably mounted thereon, a spring secured to said sleeve, and a locking-lug carried by said spring designed to engage the notches of said bar for locking the sleeve against movement with respect to the bar, and antifriction means carried by said sleeve and designed to movably support the same, substantially as described.

4. In a window-washing apparatus, the combination with suitable bar carrying window-cleaning means, of a sleeve slidably mounted on said bar, means for locking the same against movement with respect to the bar, arms projecting laterally from said sleeve, wheels carried by said arms designed to movably support said sleeve and bar, and means for preventing lateral play of said wheels, substantially as described.

5. In a window-washing apparatus, the combination with a suitable horizontal bar carrying window-washing means, and provided with an inner end having circular or disk form constructed with radial notches therein, of an arm pivotally secured to said bar, a slide carried by said arm movable longitudinally thereof, and means normally pressing said slide into engagement with said notches for locking the arm against movement relative to the standard, substantially as described.

6. A window-washing apparatus, comprising a bar, means carried thereby for cleaning a window the inner end of said bar being in circular or disk form and provided with radial notches, an operating-arm pivotally attached to said bar and provided with a longitudinal slot, designed when the arm is swung upon its pivot to be successively brought into register with said radial notches, a slide mounted in said slot, and means normally pressing the same into engagement with said notches, substantially as described.

7. A window-washing apparatus, comprising in its construction a bar, means carried thereby for cleaning a window, the inner end of said bar being in circular or disk form and provided with radial notches, an operating-arm pivotally attached to said bar and provided with a slot designed to be brought successively into register with said notches as the arm is swung upon its pivot, a slide mounted in said slot, means for normally pressing said slide into engagement with said notches, and means for disengaging said slide, substantially as described.

8. A window-washing apparatus, comprising a bar, means carried thereby for cleaning a window, the inner end of said bar being circular or disk form and provided with radial notches, an arm bifurcated and having its bifurcated portions extending on either side of the circular end of said bar and pivotally secured thereto, longitudinal slots being formed in said bifurcated portions designed to be brought successively into register with said notches when the arm is swung upon its pivot, a slide moving in said slots, a spring normally pressing said slide into said notches, and a pivoted lever engaging said slide and designed to be operated for releasing the engagement of the slide with the notches, substantially as described.

9. In a window-washing apparatus, the combination with a bar carrying window-washing means, notches being formed in said bar at various points intermediate its length, of a support for said bar, slidably engaging the same, means on said support designed to engage said notches for locking the support against movement with respect to the bar, and antifriction means movably carrying said support and traveling back and forth on the window-sill, substantially as described.

10. In a window-washing apparatus, the combination with suitable bar carrying window-cleaning means, of a sleeve slidably mounted on said bar, locking means carried by said sleeve, wheels carried by suitable bearings secured to said sleeve, and arms extending laterally from said sleeve with their free ends contiguous said wheels for preventing lateral play thereof, substantially as described.

11. A window-washing apparatus comprising a vertical standard, a casing inclosing the lower end thereof, a horizontal bar extending into said casing, and pivoted thereto, a spring secured to said casing, and a lug carried by said spring designed to normally project into said horizontal bar for locking the same against pivotal movement, substantially as described.

12. A window-washing apparatus, comprising a standard, a casing inclosing the lower end thereof and secured thereto, a horizontal bar extending into said casing beneath the lower end of said standard and designed to contact therewith, means pivotally securing said horizontal bar to said casing, and spring-pressed means for locking said horizontal bar against movement upon its pivot, substantially as described.

In testimony whereof I hereunto affix my signature in presence of two witnesses.

SIMEON C. LAWLOR.

Witnesses:
JAMES T. WATSON,
JOHN J. KUSE.